Dec. 8, 1953 P. OKEY 2,662,191
ELECTROSTATIC MACHINE

Filed July 31, 1952 2 Sheets-Sheet 1

INVENTOR.
PERRY OKEY
BY
Cubett, Mahony & Miller
ATT'YS

Dec. 8, 1953   P. OKEY   2,662,191
ELECTROSTATIC MACHINE
Filed July 31, 1952   2 Sheets-Sheet 2
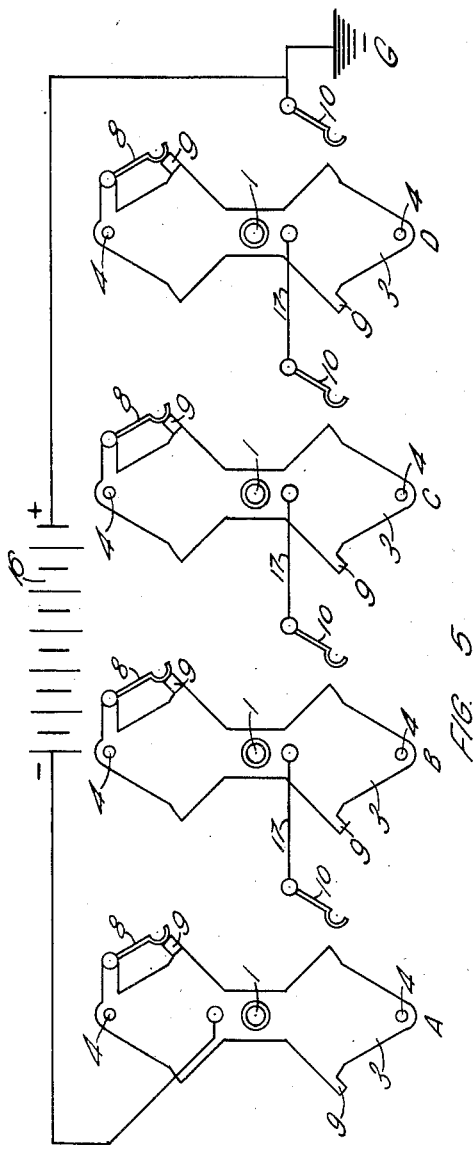
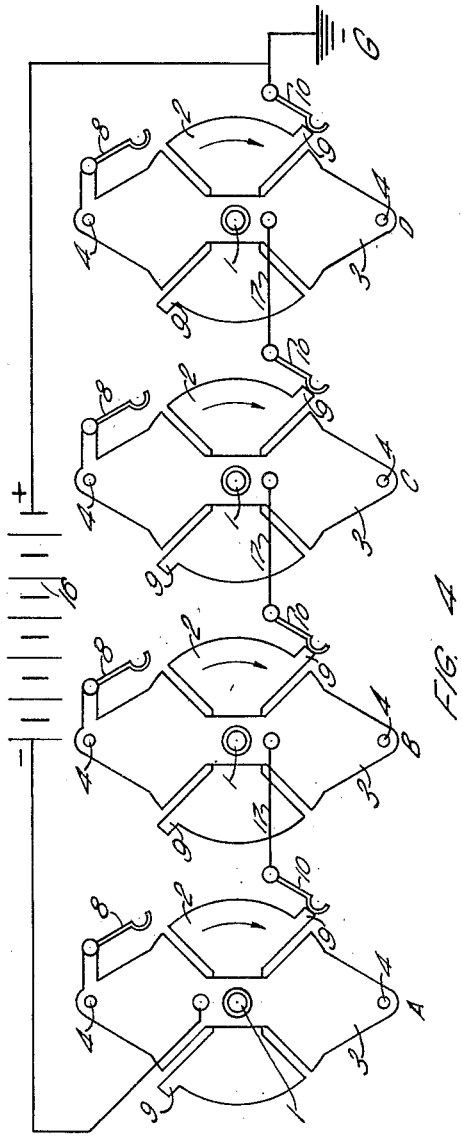
INVENTOR.
PERRY OKEY
BY
ATTYS Patented Dec. 8, 1953

2,662,191

UNITED STATES PATENT OFFICE 2,662,191

ELECTROSTATIC MACHINE

Perry Okey, Columbus, Ohio

Application July 31, 1952, Serial No. 301,948

3 Claims. (Cl. 310—6)

This invention relates to an electrostatic machine which may be used to generate very high potentials or to utilize very high potentials for the development of power. It may be designed to generate or utilize electrical potentials of any desired voltage and with any required efficiency up to very close to 100 per cent. The design is simple, the structure consisting essentially of a series of separately insulated variable capacitors, preferably of a rotary type.

The arrangement of the elements is shown in the drawings wherein like parts have similar numbers of references and wherein:

Figure 4 is a diagrammatic view showing the series of capacitor units side-by-side rather than superimposed as in Figure 1, the rotor plates being shown almost entirely out from between the stator plates, that is, in maximum registry.

Figure 5 is a view similar to Figure 4 but showing the rotor plates almost completely within the stator plates, that is, in maximum registry.

The whole assembly is made up of a series of identical units, the number required being determined by the operating voltage and the efficiency required, the capacity being governed by the size or area of the units and the speed of rotation.

The drawings show that each unit consists of a rotary plate variable capacitor wherein there are two outer plates usually called stators, and one rotatable plate, generally termed the rotor, which is mounted between the stator plates. For the sake of simplicity the drawings show only four units although in practice the number may be as desired or required even exceeding a hundred.

Figure 2:
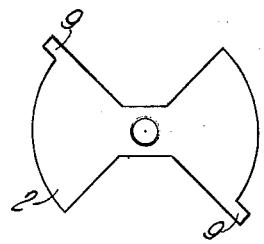
Figure 2 is a plan view of one of the rotor plates of the machine.
Figure 3:
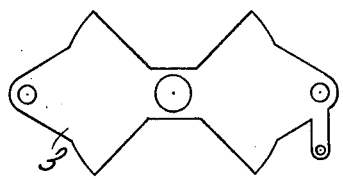
Figure 3 is a plan view of one of the stator plates of the machine.

Referring to Figure 2, numeral 2 indicates one rotor plate. Figure 3 shows one stator plate indicated by numeral 3, Figure 4 is a side elevation of a four unit assembly wherein numeral 1 indicates a shaft which is of insulating material and numerals 2 indicate four rotors fixed to shaft 1. Above and below each rotor 2 are mounted stator plates 3 which are supported by two insulating rods 4. The stator plates 3 of each unit are separated by a metallic spacer 14 on each rod 4 to maintain electrical contact between them. Insulating spacers 15, surrounding rods 4, are used to separate and insulate each unit from all others.

At each end of the assembly yokes 13 are provided for mounting the shaft bearings 5 and are insulated from adjacent stators 3 by insulating spacers 15a. A pulley 6 fixed to shaft 1 is provided for a power take-off or power input, according to whether the machine is generating or motoring.

Figure 1:
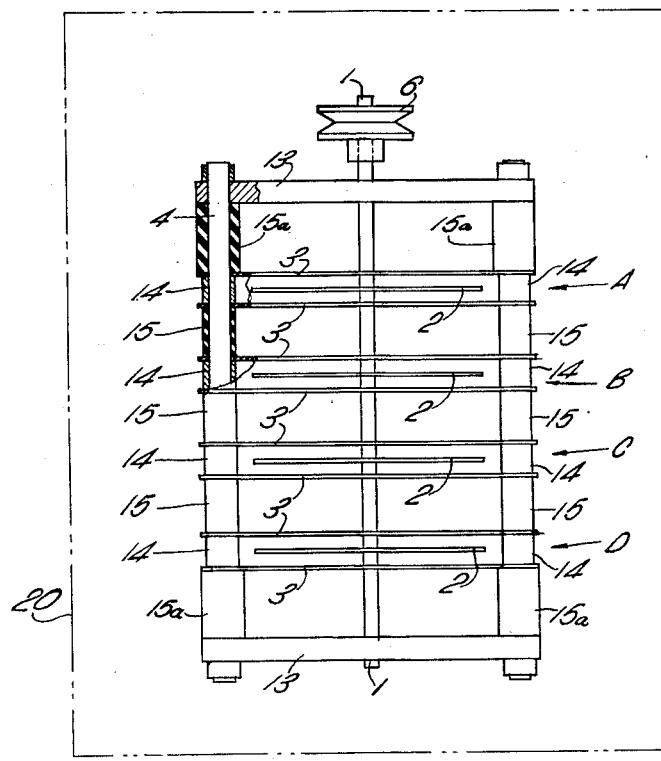
Figure 1 is a side elevational view, partly broken away, of an electrostatic machine constructed in accordance with my invention.

Operation of the machine is best shown in Figures 4 and 5 wherein the separate units are indicated at A, B, C, and D, and are shown side-by-side instead of one above the other as in Figure 1.

In Figure 5 the rotors 2 are shown as being in maximum registry with the stator plates 3 and in Figure 4 the rotors 2 are shown turned 90 degrees clockwise and in minimum registry with the stator plates 3.

Each rotor plate 2 has two lugs 9 extending from the opposed peripheral lobes thereof and positioned on the leading edge of each lobe. Each lug 9 is arranged to contact brushes 8 and 10 at every revolution of the rotor. Brush 8 is carried by the upper stator 3 of each unit. Brush 10 of each unit is either mounted on a stator 3 of the unit immediately below the unit whose rotor lugs 9 are contacted by brush 10 or is connected to the stator 3 of the next unit by a wire 17 and may be mounted on a suitable support (not shown) in the path of movement of rotor 2 of the unit with which it is associated.

The machine preferably is enclosed within a vacuum chamber which is indicated by broken lines 20 in Figure 1.

Having set forth a description of the machine I will give an explanation of its operation as a motor for example.

The machine will operate equally well in either direction of rotation.

Assume that the shaft 1 carrying rotors 2 to be turned in a clockwise direction, and further assume that a source of potential 16 is the driving power and has its negative terminal connected to the two stators 3 of the first unit A in the series, and its positive terminal to the last brush 10 of the series of units and also to ground G.

If the voltage of the source 16 is 100,000 volts, the stator 3 of the first unit A will then have a negative potential of 100,000 volts to ground. As the rotors 2 turn to the position shown in Figure 5, brushes 8 will contact the lug 9 on the rotor 2 of the first unit A and such rotor will acquire a negative potential of 100,000 volts to ground.

As both stators 3 of unit A and rotor 2 of unit

A now have the same potential and the same sign, a repulsive force exists between them which will rotate the rotor 2 of the first unit A through an angle of 90 degrees at which position the lug 9 on rotor 2 of unit A will contact the brush 10 which is connected by the wire 17 to the stators 3 of the second unit B of the series. During said contact a part of the charge on rotor 2 of the first unit A will be transferred to the stators 3 of the second unit B and the potential of these stators will be raised to say 75,000 volts negative to ground. The potential of the rotor 2 of the first unit A has likewise dropped to 75,000 volts, causing a difference of potential of 25,000 volts between the stators 3 of the first unit A and the rotor 2 of the first unit A which results in an attractive force which again turns the rotor through 90 degrees thus bringing such rotor to the position shown in Figure 5, this cycle is repeated twice in each revolution so that the rotor of each unit receives four torque impulses during each revolution.

Assuming a straight line characteristic, the stators 3 of the third unit C could acquire a negative potential of 50,000 volts and those of the fourth unit D would acquire a negative potential of 25,000 volts, which would also be the potential of the rotor 2 the last unit D which would discharge 25,000 volts to ground through the last brush 10. Hence a four unit system will have an efficiency of 75 per cent.

However, if the cycle were carried through 100 units the final voltage from an initial voltage of 100,000 would be 1000 volts and the efficiency of the system 99 per cent.

It should be understood that the description of events occurring in the first unit A will apply to all subsequent units in the system, regardless of number.

In machines of this type utilising very high voltages, the efficiency is inherently high due to the negligible $I^2R$ loss, no iron loss, and no windage loss as they are operated in a vacuum.

To operate the machine as a generator, the potential source 16 is removed, and a relatively low potential source, say 50,000 volts, is connected between the last brush 10 and the ground. Then upon driving the machine by a power source through pulley 6, the initial potential will be augmented by a definite increment in each stage or unit.

Having thus described my invention what I claim is:

1. An electrostatic machine comprising a series of separately insulated capacitor units each including a pair of stator plates and a rotor plate mounted for rotation therebetween, said units being arranged in superimposed relationship and the rotor plate of each being relatively rotatable from a position of maximum registry with the stator plates of such unit to a position of minimum registery with such stator plates, a contact electrically connected to the stator plates of each unit and engageable with the rotor plate of such unit as the rotor plate reaches its position of maximum registry with the stator plates, a contact electrically connected to the stator plates of the succeeding unit of the series and engaged by the rotor plate of such succeeding unit when the rotor plate of the first unit is in a position of minimum registry with the stator plates of the first unit, the stator plates of the first unit of the series being connected at all times to a source of voltage and the rotor plate of the last unit being intermittently connected to ground when it moves into minimum registry with the stator plates of such last unit.

2. An electrostatic machine comprising a series of separately insulated capacitor units each including a pair of stator plates and a rotor plate mounted for rotation therebetween, said units being arranged in superimposed relationship and the rotor plate of each being relatively rotatable from a position of maximum registry with the stator plates of such unit to a position of minimum registry with such stator plates, a contact electrically connected to the stator plates of each unit and engageable with the rotor plate of such unit as the rotor plate reaches its position of maximum registry with the stator plates, a contact electrically connected to the stator plates of the succeeding unit of the series and engaged by the rotor plate of such succeeding unit when the rotor plate of the first unit is in a position of minimum registry with the stator plates of the first unit, the stator plates of the first unit being connected at all times to ground and the rotor plate of the last unit being intermittently connected to ground when it moves into minimum registry with the stator plates of such last unit, and a low potential source between ground and the connection to the rotor plate of the last unit.

3. An electrostatic machine comprising a series of separately insulated capacitor units each including a pair of stator plates and a rotor plate mounted for rotation therebetween, said units being arranged in superimposed relationship and the rotor plate of each being relatively rotatable from a position of maximum registry with the stator plates of such unit to a position of minimum registry with such stator plates, a contact electrically connected to the stator plates of each unit and engageable with the rotor plate of such unit as the rotor plate reaches its position of maximum registry with the stator plates, a contact electrically connected to the stator plates of the succeeding unit of the series and engaged by the rotor plate of such succeeding unit when the rotor plate of the first unit is in a position of minimum registry with the stator plates of the first unit, the rotor plate of the last unit being intermittently connected to ground when it moves into minimum registry with the stator plates of such last unit.

PERRY OKEY.

References Cited in the file of this patent

UNITED STATES PATENTS

| Number | Name | Date |
|---|---|---|
| 2,610,994 | Bosch et al. | Sept. 16, 1952 |
| 2,617,976 | Felici | Nov. 11, 1952 |
| 2,620,447 | Malpica | Dec. 2, 1952 |